United States Patent [19]

Hirschkoff

[11] 4,059,895
[45] * Nov. 29, 1977

[54] FULL POSITION SAFETY BRAKE FOR PORTABLE CHAIN SAW

[75] Inventor: Sidney Hirschkoff, Los Angeles, Calif.

[73] Assignee: McCulloch Corporation, Los Angeles, Calif.

[ * ] Notice: The portion of the term of this patent subsequent to June 22, 1993, has been disclaimed.

[21] Appl. No.: 678,169

[22] Filed: Apr. 19, 1976

Related U.S. Application Data

[63] Continuation-in-part of Ser. No. 515,047, Oct. 15, 1974, Pat. No. 3,964,333.

[51] Int. Cl.² .................. B27B 17/00; B60T 13/04
[52] U.S. Cl. ................................. 30/382; 188/166
[58] Field of Search ............... 30/381, 382, 383, 384, 30/385; 188/77 R, 166

[56] References Cited

U.S. PATENT DOCUMENTS

| | | | |
|---|---|---|---|
| 3,380,493 | 4/1968 | Giroux | 30/382 |
| 3,776,331 | 12/1973 | Gustafsson | 30/381 X |
| 3,937,306 | 2/1976 | Naslund | 30/383 X |
| 3,970,178 | 7/1976 | Densow | 30/381 X |

Primary Examiner—Jimmy C. Peters
Attorney, Agent, or Firm—Kenway & Jenney

[57] ABSTRACT

A hand portable chain saw with a movable safety bar for actuating a chain brake has a bracket and a lineally-acting spring which together provide a detent for holding the safety bar in the nonbraking operating position, but yet accelerate the braking movement of the safety bar upon disengagement from the detent.

The carrying handle for a portable chain saw encircles the top and both sides of the saw housing to enhance both operator safety and convenience. The brake-actuating safety bar on the saw has a similar wrap-around contour to ensure engagement by the operator in the event of untoward movement of the saw for essentially any sawing position.

16 Claims, 6 Drawing Figures

FULL POSITION SAFETY BRAKE FOR PORTABLE CHAIN SAW

BACKGROUND OF THE INVENTION

This application is a continuation-in-part of the commonly-assigned application for U.S. patent for "Safety Braking Mechanism For Portable Chain Saw", Ser. No. 515,047, filed Oct. 15, 1974, and which issued on June 22, 1976 as U.S. Pat. No. 3,964,333.

This invention relates to handling and safety improvements in a hand portable chain saw. In particular, it provides an improved mechanism for braking the saw chain in the event of untoward movement of the saw, including in particular the hazardous kickback to which chain saws are subject. The invention also provides improvements in both the carrying handle of the saw, and in the safety bar which is located forward of the handle and initiates the braking operation.

It is known that hand portable chain saws are subject to a hazardous kickback motion during operation, and that a chain brake can be provided to reduce the risk of operator injury in the event of a kickback or other untoward saw movement. See for example U.S. Pat. Nos. 3,776,331 of Gustafsson; 3,934,345 of Hirschkoff; and 3,937,306 of Nashlund et al; and see also the February 1976 issue of Chain Saw Age for a state-of-the-art view of these aspects of chain saws.

However, some prior safety brake mechanisms do not provide protection for all operating positions of the saw. Others are relatively complex in construction and/or operation, such as employing multiple-step release and braking action. Prior saws also have not provided all-position handle structures with equally-accessible chain brake actuation.

Accordingly, it is an object of this invention to provide improved handle and chain braking structures for hand portable chain saws.

A more specific object is to provide a chain saw having both a carrying handle and a safety bar which are readily accessible during operation of the saw in multiple orientations.

Another object of the invention is to provide a single-action chain brake which operates with a rotatable safety bar and which is located spaced from the rotation axis of the bar.

It is also an object of the invention to provide a chain brake employing a lineally acting resilient element, such as a coil spring, which both holds the brake in disengagement, and alternatively applies braking force upon brake actuation.

Other objects of the invention will in part be obvious and will in part appear hereinafter.

GENERAL DESCRIPTION OF THE INVENTION

A hand portable chain saw embodying features of the invention has a carry handle, with which the operator supports most if not all the saw weight during use, which extends fully in wrap-around fashion about the top and the two sides of the saw housing. This handle is in addition to the control handle conventionally located at the rear of the saw opposite the chain-carrying arm, and which is fitted with the throttle and on-off controls. The wrap-around configuration of the carry handle provides ready access to the operator from both above and at least one side of the saw for any upright or sideways orientation of the saw, i.e. without regard to whether the saw is oriented for cutting vertically or horizontally to the right or to the left.

Located forward of the wrap-around housing-encircling drive handle, and in the path of the operator's hand, wrist, or arm in the event of kickback or other untoward movement of the saw, is a safety bar which has a similar housing-encircling wrap-around configuration. The safety bar is mounted to the housing, by means of rotatable connection at the ends of the bar, for a swinging movement about an axis located adjacent the lower face of the housing. This remote location of the rotation axis endows the safety bar with maximal sensitivity for deflection to actuate the brake mechanism.

The wrap-around handle configuration facilitates orientating the saw as appropriate for the desired cut. Hence it diminishes restrictions on the orientations with which the operator can use the saw, and correspondingly minimizes the likelihood that the operator will use the saw with an awkward, off-balance or otherwise insecure posture. The wrap-around safety bar with its extremely-located axis of rotation provides automatic chain braking for any such orientation of the saw. The combination of wrap-around handle and safety bar structures thus enhances both the efficiency and the safety of the saw.

A further characterization of the invention is a brake control and actuating mechanism having a lineally-acting spring which both biases the safety bar to apply the braking force and applies a brake latching detent to the safety bar. The brake employs the known arrangement in which a braking member is linked to the safety bar for brake engagement and, alternatively, disengagement. These known brakes also have a mechanism for holding the safety bar in the operating, i.e. brake-disengaging, position. However, a characteristic of a saw embodying the present invention is a coil spring or equivalent resilient element having substantially lineal action. When the safety bar is in the brake-disengaging position, the spring presses a detent against the safety bar. This action holds the safety bar cocked in an operating condition where the brake is released from the cutting chain. When the safety bar is disengaged from the detent, the same spring assumes the opposite role and thrusts the safety bar into the brake-engaging position.

This control and actuating mechanism of the invention is advantageously used with the wrap-around safety bar which the invention provides. This is because the remote location of the pivotal mounting of the wrap-around safety bar to the housing results in essentially lineal motion of the safety bar at the point where the brake-controlling mechanism advantageously is applied. Further, the spacings between the several rotation axes and operating points of the safety bar and the control mechanism provide positive mechanical operation. Hence, a saw combining the features of the invention provides a rapid, essentially snap-like, single-action braking which the operator automatically initiates when using the saw in essentially any orientation. The force of the hand against the safety bar plus the force of the spring causes a faster application of the brake and since the force of the hand is additive to the force of the spring, the stopping time of the chain is greatly shortened.

The invention accordingly comprises the features of construction, combinations of elements, and arrangements of parts exemplified in the embodiment hereinafter set forth, and the scope of the invention is indicated in the claims.

BRIEF DESCRIPTION OF DRAWINGS

For a further understanding of the nature and objects of the invention, reference should be had to the following detailed description and the accompanying drawings, in which.

DESCRIPTION OF ILLUSTRATED EMBODIMENTS

Figure 1:
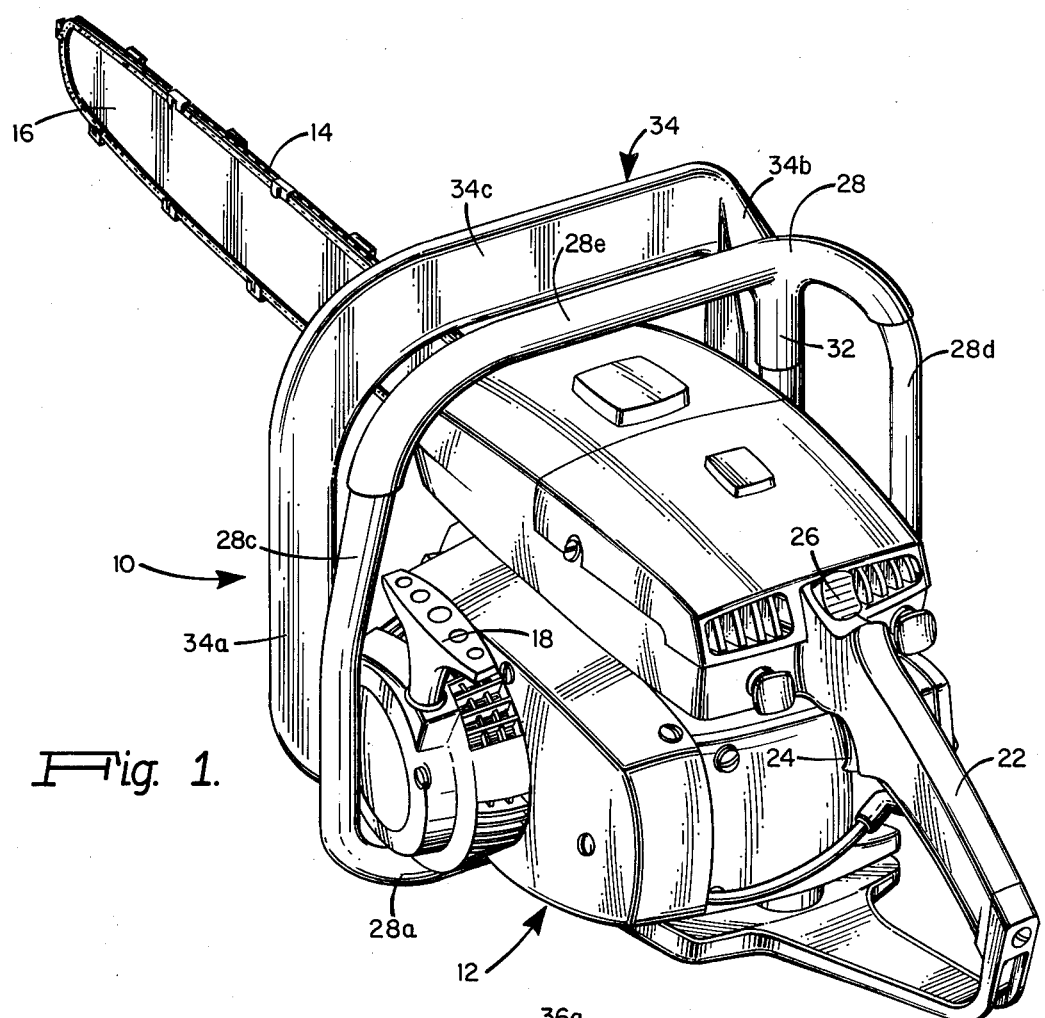
FIG. 1 shows a hand portable chain saw embodying the invention.
Figure 2:
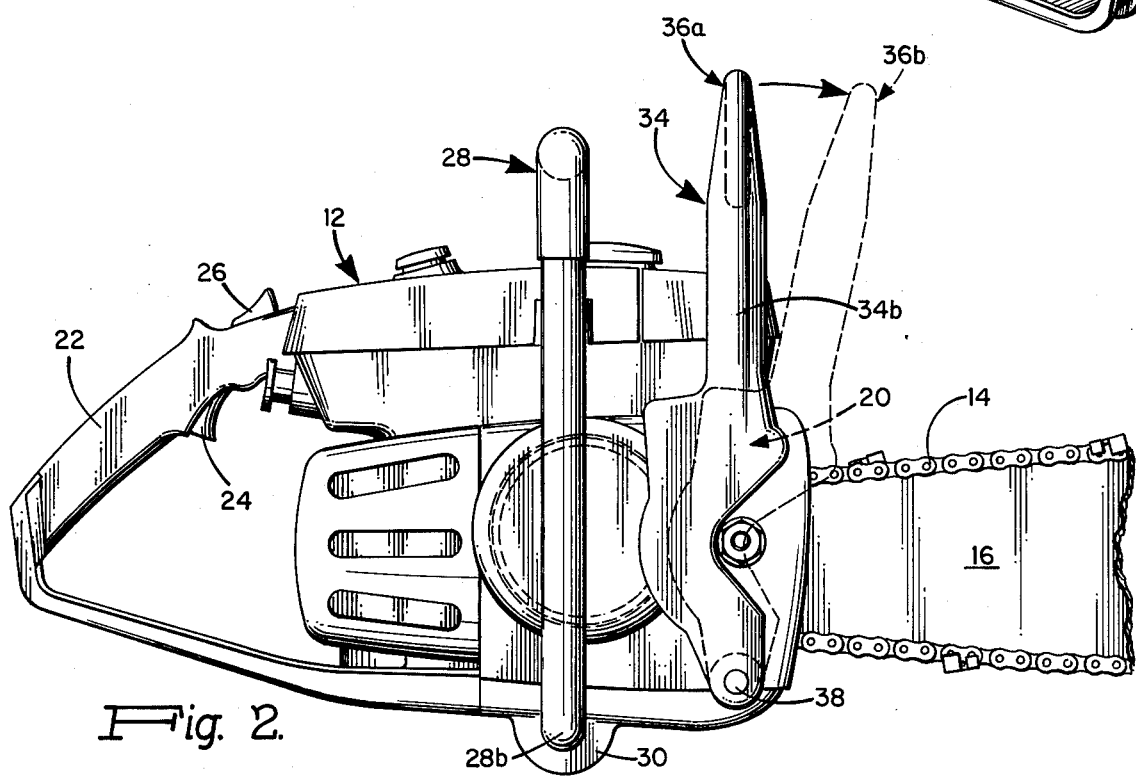
FIG. 2 is a side elevation view of the saw of FIG. 1 showing both the operating and the braking positions of the safety bar.
Figure 3:
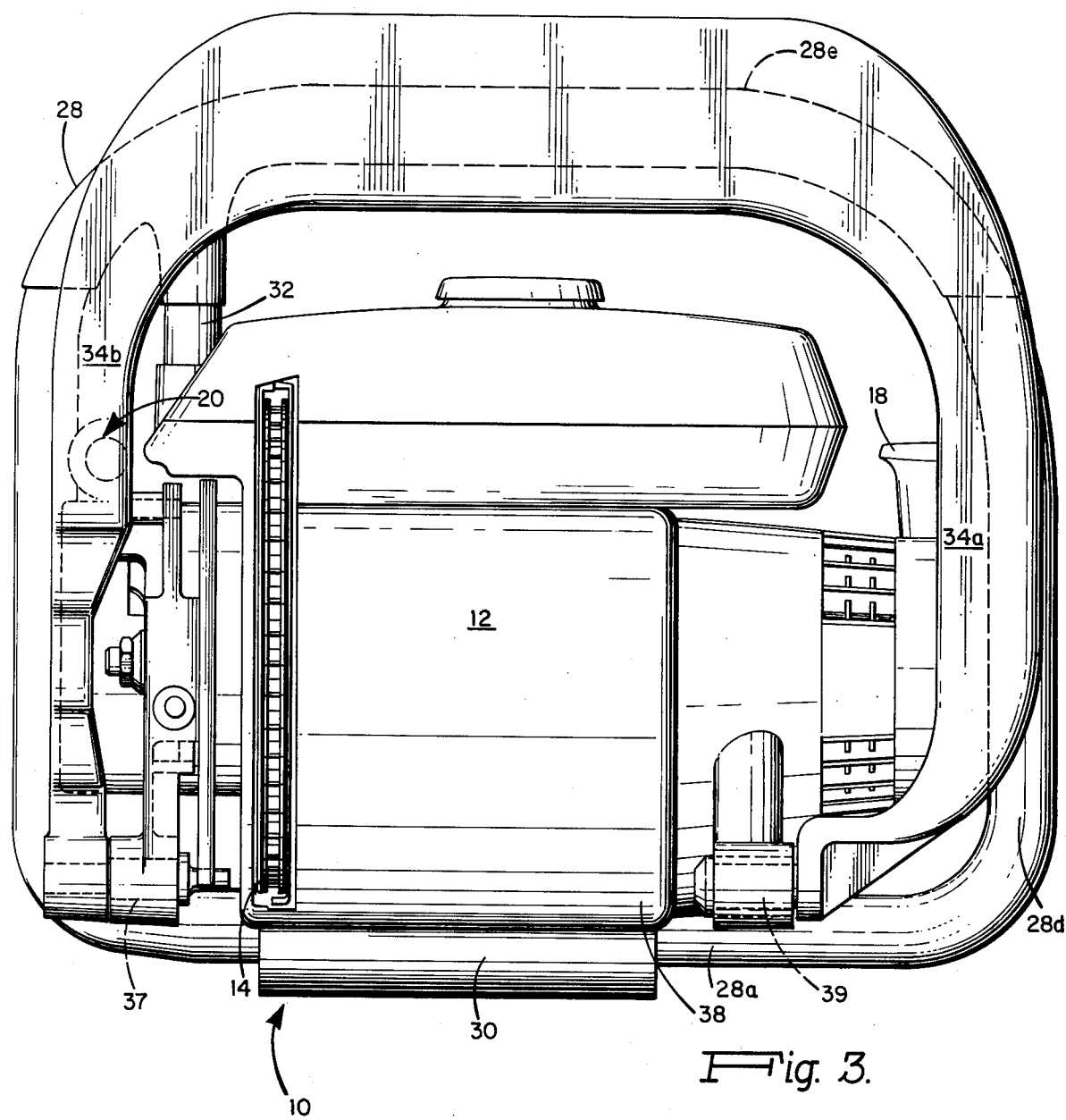
FIG. 3 is a front elevation view of the saw of FIG. 1.

A hand portable chain saw 10 embodying the invention as shown in FIGS. 1, 2 and 3 has a housing 12 and a sawing chain 14 trained over a forwardly projecting support arm 16. The housing contains the saw drive mechanism, conventionally an internal combustion engine coupled by way of a power transmission and clutch to the sawing chain. A rewind starter 18 is accessible on one side of the housing 12 and a chain brake 20, described in further detail below, is located on the other side of the housing. At the rear of the housing is a control handle 22 fitted with a throttle trigger 24 and an on-off switch 26.

A carry handle 28 encircles the housing top 12a and two sides 12b and 12c roughly midway along the housing length so that the saw weight is approximately balanced at the handle. The operator supports the weight of the saw from the handle 28, and hence this weight balance is important for operator convenience and safety. The operator uses the control handle 22 to stabilize the saw, and to control the chain operation and speed by means of the throttle trigger 24 and the switch 26.

The carry handle 28 is rigidly fixed to the housing 12. In the illustrated embodiment the handle ends are secured within a tubular mount 30 which projects on the housing below the bottom panel 12d; this tubular projection provides a raised base on which to rest the saw. The carry handle 28 has a continuous, housing-encircling wrap-around configuration between the angled end portions 28a, by which it is mounted. It thus has an overall U-shape between these end portions and formed with side portions 28c and 28d that form legs of the U and a top portion 28e that forms the base of the U-shape. A support stud 32 extends from the handle 28 adjacent the juncture of the top portion 28e with the side portion 28d, and is fastened at its other end to the housing, illustratively at the corner where the top and side meet. Thus in the preferred embodiment illustrated, the carry handle 28 has three points of attachment to the saw housing for secure rigidity throughout the entire wrap-around extent of the handle. Further, there are no free ends or other protrusions that could snag clothing or otherwise be hazardous.

FIGS. 1 and 3 show that this handle construction fully encircles the housing top and sides. The drive handle accordingly is accessible from both above and at least one side of the saw for the many orientations in which the saw is likely to be used. Further, except for the attachments to the housing, the entire span of the drive handle is spaced outwardly from the housing openly to receive the operator's hand between the handle and the housing for secure gripping of the handle.

With further reference to FIGS. 1, 2 and 3, the saw 10 has a safety bar 34 that actuates the chain brake 20 when displaced from an operating position 36a, FIG. 2, to a braking position 36b. The safety bar follows the full wrap-around contour of the carry handle 28 to be interposed between the operator's hand on the carry handle and forward portions of the saw for all cutting orientations. The safety bar 34 thus has a continuous structure which encircles the top and both sides of the saw housing 12, and has an overall U-shape with leg portions 34a and 34b and a base portion 34c.

The safety bar is located on the housing 12 spaced forward of the drive handle and aligned generally parallel to it when in the operating position 36a. The bar is mounted for swinging rotation relative to the housing about an axis 38 by means of shafts 37 and 39 fixed on the ends of the bar and rotatably seated to the housing at locations lowermost on the housing sides.

This structure interposes the safety bar in the path of the operator's hand, wrist or arm in the event the saw kicks back or in case of other potentially hazardous untoward movement of the saw. The operator's body accordingly will engage the safety bar and thereby displace it from the operating position 36a. As will now be described, this displacement of the safety bar actuates the chain brake to stop the chain essentially instantaneously.

Figure 4:
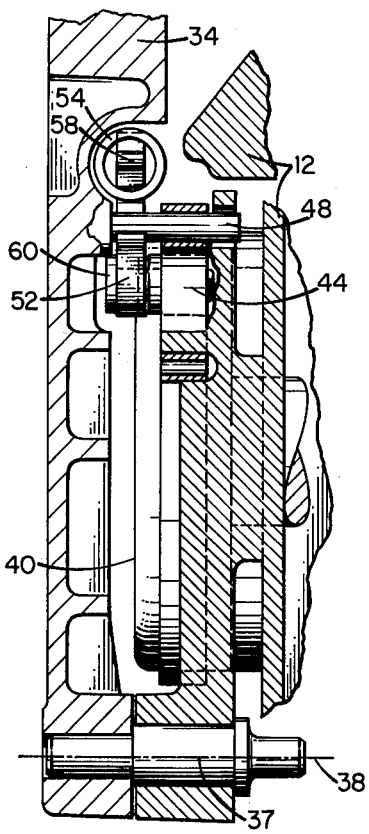
FIG. 4 is a partial sectional view of the saw as shown in FIG. 3 and detailing the brake mechanism.
Figure 5:
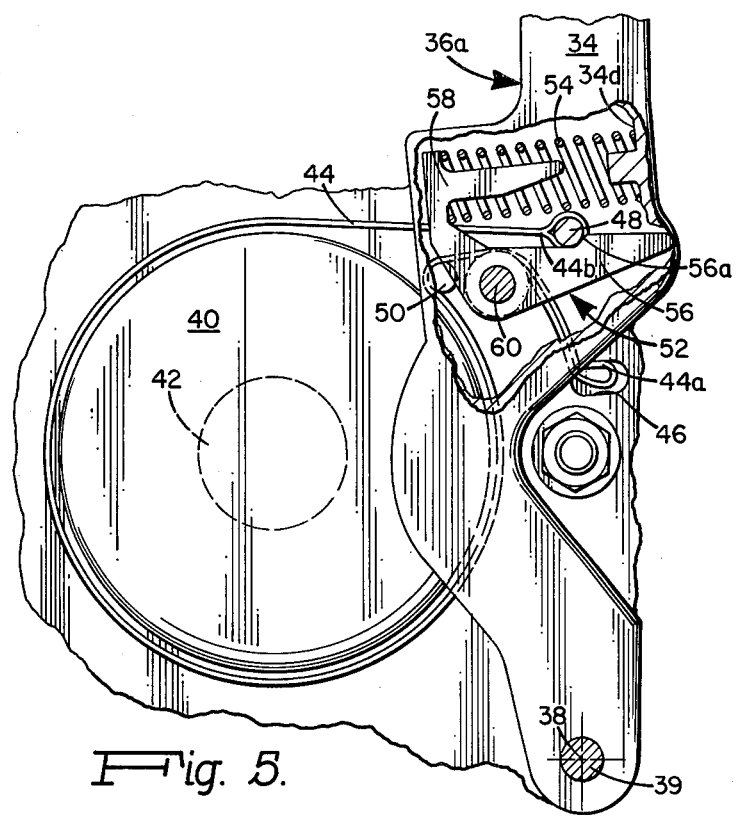
FIGS. 5 and 6 are fragmentary elevation views, of the side opposite to that shown in FIG. 2 and partly broken away, showing the brake in the operating and the braking conditions, respectively.
Figure 6:
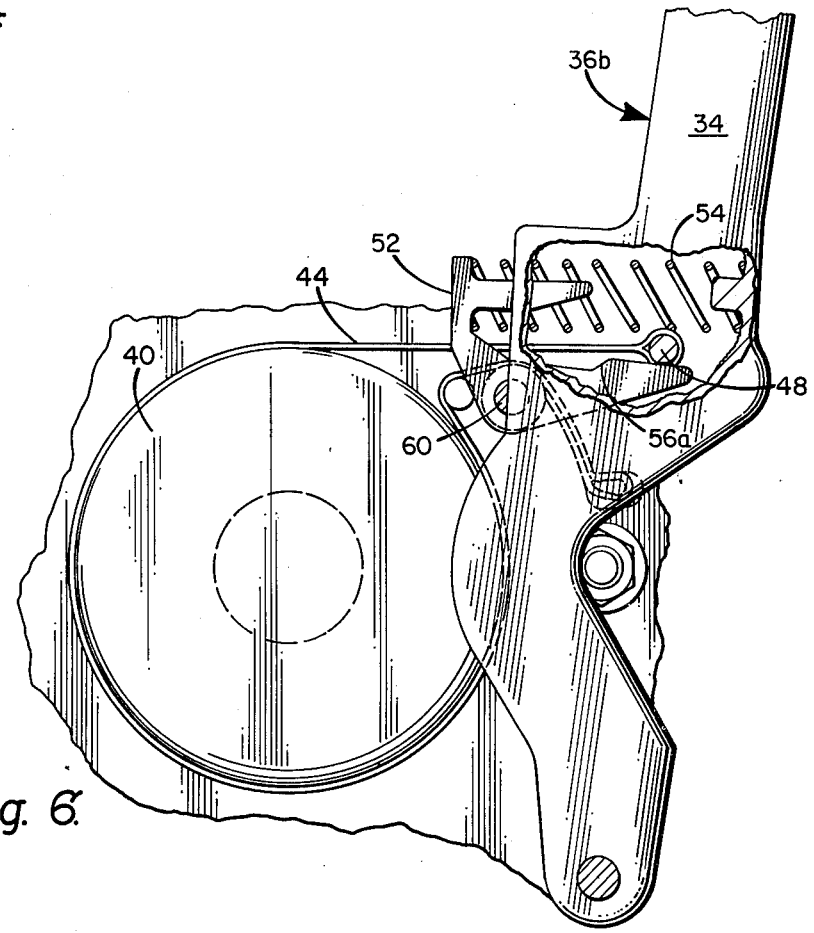

With reference to FIGS. 4, 5 and 6, the chain brake 20 (FIG. 2) applies braking force to a brake drum 40 that the saw drive mechanism rotates upon driving the saw chain. Typically, within the housing, the chain is trained on a sprocket wheel which is mechanically coupled to the shaft 42 on which the brake drum rotates. In one construction, the brake drum 40 rotates with a driven member of the clutch that drives the chain.

The brake employs a flexible brake band 44 which has one end 44a secured to the housing, illustratively by seating a loop at that end of the band within a cavity 46 recessing the housing. The other end 44b of the brake band is secured to the safety bar 34, for example, by seating a loop at that end on a pin 48 extending from the safety bar. The brake band extends from the pin 48 along a path extending length-wise of the saw and then around the periphery of the brake drum 40. Adjacent the fixed end 44a, the brake band passes over a guide surface provided by a housing pin 50 and thence to the housing anchorage in cavity 46. The brake band thus encircles nearly the full periphery of the brake drum 40.

The pin 48 is located on the safety bar spaced from the rotation axis 38 by a sufficient distance such that it moves along an essentially straight path directed along the saw length when the safety bar moves between the two positions shown in FIG. 2.

This movement of the pin 48 operates the brake, as FIGS. 5 and 6 illustrate. In particular, when the safety bar 34 is in the non-braking, operating position of FIG. 5, the brake band 44 loosely circles the drum 40 and hence applies no brake force to it. The brake accordingly does not interfere with free rotation of the drum 40 and correspondingly with the drive motion applied to the chain. However, upon movement of the safety bar to the braking position, FIG. 6, the pin 48 moves forward with the safety bar and pulls the brake band taut around the brake drum. Frictional engagement between the drum and the brake band, either of which can carry brake linings according to conventional practice, arrests the rotation of the brake drum 40 and thereby stops the sawing chain.

A detent and thrust mechanism, formed by a detent bracket 52 and a lineally-acting spring 54, latches the safety bar in the operating position but yet drives it into the braking position when the safety bar is unlatched. As FIG. 4 shows, the bracket and the spring are nested between the safety bar and one side of the housing. The bracket 52 forms two substantially orthogonal arms, one a detent arm 56 which extends along the length of the saw and the other an upstanding lever arm 58. The arm 56 has an upwardly-facing detent step 56a dimension to latchingly receive and retain the pin 48, as FIG. 5 shows, when the safety bar is retracted to the operating position. The bracket 52 is mounted — between the two arms which it forms — to the housing on a stem 60 for rotation about an axis parallel to the axis 38 of safety bar rotation. The two rotation axes are spaced apart along the safety bar, i.e. in the direction transverse to the saw length. The spring 54, preferably a coil spring as shown, is compressively seated between the arm 58 and a rearwardly facing platform surface 34d on the safety bar. Each element 58 and 34 illustratively includes a stud which fits within the open center of the spring to retain it from accidental dislodgement. Further, the studs are arranged to abut one another in the event the safety bar is rotated too far counterclockwise; they thus prevent overcompression of the spring 54. Clockwise rotation of the safety bar is limited by the length of the brake band 44, as FIG. 6 shows. (Directions of rotation are termed clockwise and counterclockwise with reference to FIGS. 2, 5 and 6.)

With the foregoing mounting by way of the detent bracket 52, the spring 54 is oriented along the saw length and is compressed more when the safety bar is in the operating position (FIG. 5) than when in the braking position (FIG. 6). This additional compression stores kinetic energy in the spring. Hence, when in the operating position, the spring increasingly pushes the bracket 52 counterclockwise about the stem 60, and thereby resiliently presses the detent shoulder 56a in front of the pin 48, to latch the safety bar in the operating position.

However, when the safety bar is struck or otherwise pressed in the forward direction, it rotates clockwise about the axis 38. This motion carries the pin 48 forward. The pin accordingly cams past the detent shoulder 56a, thereby rotating the bracket 52 and hence the arm 58, clockwise. This in turn maintains initial compression in the spring 54. The force of the compressed spring pushes against the safety bar and thereby thrusts it and the pin 48 forward to engage the brake band against the drum 40.

The brake thereafter is released simply by swinging the safety bar backwards, i.e. counterclockwise. This motion latchingly re-engages the pin 48 in the detent of arm 56 and again compresses the spring 54 so that it biases the detent bracket 52 to hold the brake cocked in the operating condition.

The foregoing construction of the control and actuating mechanism provides a moment arm in the length of the safety bar between the axis 38 and the spring 54, i.e. and the spring-engaging shoulder 34d. As illustrated, this moment arm preferably is longer than the second moment arm provided by the length of safety bar between the axis 38 and the pin 48. It is the former moment arm through which the spring acts to rotate the safety arm, and the latter moment arm moves the pin 48 to apply the brake.

NON-OBVIOUSNESS AND SCOPE OF INVENTION AND SUMMARY OF ADVANTAGES

The present invention is characterized by means, operation and results which are wholly different from those of the prior art. These differences, coupled with the failure of the prior art to suggest the present invention as well as that of the aforesaid parent application Ser. No. 515,047, evidence the non-obviousness of the invention of the present application and applicant's parent case.

For example, structures disclosed and claimed in prior patents such as Gustafsson U.S. Pat. No. 3,776,331 (1973) and Naslund et al U.S. Pat. No. 3,937,306 (1976) are predicated on the use of separate springs for operating brake band biasing means and latching means. They do not contemplate either the unique linear or torsional embodiments of the detent-biasing arrangements of this application and its parent case.

Moreover, prior art devices as featured in the Gustafsson patent involve the use of a right locking mechanism with an associated trigger release device which entail two-step operation and require a recocking of lock components before relatching can be effected. In the first Gustafsson step, the locking mechanism is released. In the second Gustafsson step, which is sequentially independent of the release step, setting of the brake band is commenced.

The different structure of the present invention and of the aforesaid parent case, in relation to prior proposals such as Gustafsson and Naslund et al, entails the use of a unique single spring arrangement — as opposed to multiple springs — for performing both brake band and safety bar biasing and safety bar detenting in a novel and advantageous manner. Moreover, in contrast with Gustafsson, this different structure enables movement of the safety bar serving, in one-step, concurrently to release the detent and intitiate the setting of the brake band. The rigid locking mechanism of Gustafsson is displaced entirely in favor of a yieldable detent approach for yieldably securing the safety bar.

A different mode of operation of the present invention, as well as the aforesaid parent case, in relation to prior art such as Gustafsson, entails the concurrence of safety bar release and brake setting action in contrast with the sequential and independent unlocking and brake band setting actions of Gustafsson. In addition, instead of moving a pawl out of engagement with a brake as contemplated by Gustafsson, the inventions of this application and its parent case entail the use of a detent which remains engaged so as to avoid the need for a recocking of trigger elements.

A different result achieved by the present invention, in contrast with Gustafsson, entails the initiation of brake setting action concurrent with the initiation of the safety bar movement, in lieu of the unlocking action of Gustafsson which intervenes before setting of the brake band can commence.

And, as noted, the yieldable detent approach of the present invention and that of its parent case wholly avoids the recocking concept of Gustafsson which is necessary to reposition the elements of a trigger-type locking mechanism before relatching of the safety bar can occur.

As to the wrap-around handle aspect of the present invention and that of the parent case, there simply is no suggestion to be found in prior art such as Gustafsson and Naslund et al.

The handle and brake of the invention will now be understood to provide improvements in operation, control and safety for a hand portable chain saw. The wrap-around carry handle mounts to the housing at a lowermost location and otherwise encircles the housing for ready gripping by the operator from essentially any direction. The saw safety bar encircles the housing in a like manner so that any untoward movement will automatically cause the operator to strike the bar and thereby trip the chain brake.

A single bracket and single spring element coupled between the safety bar and the saw housing latch the safety bar in a normal standby position where the saw operates free of the brake. However, dislodgement of the safety bar from this position causes the bracket-spring combination to drive the safety bar — aided by whatever force the operator's thrust applies — to the braking position. A single movement of the spring-biased bracket produces both the release and the brake-applying thrust.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In a hand portable chain saw having a housing with a carrying handle, a cutting chain, a support bar projecting forwardly from the housing for supporting the cutting chain for endless movement, motive means carried by the housing for driving the cutting chain, and a safety brake for stopping the cutting chain, the improvement in said safety brake comprising
   A. safety bar means mounted on said housing for swinging movement relative to a first axis and arranged to be swung forward upon being struck by an operator, said safety bar means having a wrap-around configuration extending around the top and sides of said housing forward of said carrying handle,
   B. a flexible brake band having a first end secured to the housing and a second end coupled to said safety bar means for movement therewith such that forward swinging of said safety bar means moves said brake band into frictional braking engagement with said motive means to stop said cutting chain, and
   C. a single spring member engaged between said safety bar means and the housing at a location spaced from said first axis and for exerting resilient force longitudinal to said forward direction, said spring member being arranged constantly to bias said safety bar means forward to said braking position, and further arranged to impose yieldable latching force on said safety bar means to resist forward movement of said safety bar means and thereby prevent inadvertent brake engagement with said motive means.

2. In a hand portable chain saw having a housing with a carrying handle, a cutting chain, a support bar projecting forwardly from the housing for supporting the cutting chain for endless movement, motive means carried by the housing for driving the cutting chain, and a safety brake for stopping the cutting chain, the improvement in said safety brake comprising
   A. safety bar means mounted on said housing for swinging movement and arranged to be swung forward upon being struck by an operator, said safety bar means having a wrap-around configuration extending around the top and sides of said housing forward of said carrying handle,
   B. a flexible brake band having a first end secured to the housing and a second end coupled to said safety bar means for movement therewith such that forward swinging of said safety bar means moves said brake band into frictional braking engagement with said motive means to stop said cutting chain, and
   C. resiliently-acting means
      1. engaged between said safety bar means and the housing for exerting resilient force longitudinal to said forward direction, and arranged constantly to bias said safety bar means forward to said braking position, and further arranged to impose yieldable latching force on said safety bar means to resist forward movement of said safety bar means and thereby prevent inadvertent brake engagement with said motive means,
      2. comprising a detent member mounted to the housing for rotation relative thereto and releasably engageable with said safety bar means for applying said latching force thereto, and a lineally-acting spring engaged between said detent member and said safety bar means and providing both said bias and said yieldable latching force.

3. In a hand portable chain saw according to claim 2, the further improvement comprising
   A. first shaft means mounting said safety bar means to the housing for rotation about a first axis, and
   B. second shaft means mounting said detent member for rotation about a second axis parallel to said first axis.

4. In a hand portable chain saw according to claim 3, the further improvement wherein
   A. said first shaft means locates said first axis adjacent a lowermost location on the housing, and
   B. said second shaft means locates said second axis spaced in the direction toward the top of the housing from said first axis.

5. In a hand portable chain saw according to claim 3, the further improvement wherein
   A. said safety bar means extends continuously along said wrap-around configuration between a pair of end portions, and
   B. said first shaft means engages said end portions for rotatably mounting said safety bar means.

6. In a hand portable chain saw having a housing, a cutting chain, a support bar projecting forwardly from the housing for supporting the cutting chain for endless movement, motive means carried by the housing for driving the cutting chain, and a safety brake for stopping the cutting chain, the improvement in said safety brake comprising A. safety bar means mounted on said housing for swinging movement about a first axis and arranged to be swung forward along a first direction upon being struck by an operator, B. a flexible brake band having a first end secured to the housing and a second end coupled to said safety bar means for movement therewith such that forward swinging of said safety bar means moves said brake band into frictional braking engagement with said motive means to stop said cutting chain, and C. a lineally-acting spring member exerting resilient force between said safety bar means and the housing at a location removed from said first axis and directed along said first direction, said spring member being arranged constantly to bias said safety bar means forward along said first direction, and further arranged to impose yieldable latching force on said safety bar means to resist movement of said safety bar means forward along said first direction and thereby prevent inadvertent brake activation.

7. In a chain saw according to claim 6, the further improvement wherein

A. said safety brake includes detent means movable between a holding position for restraining movement of said safety bar means along said first direction and a release position allowing forward movement of said safety bar means.

B. said lineally-acting spring member is arranged to bias said detent means into said holding position for imposing said yieldable latching force, and C. said detent means is movable to said release position against the bias of said spring member in response to forward movement of said safety bar means.

8. In a chain saw according to claim 7, the further improvement wherein said spring member and said detent means are arranged for increasing the bias of said spring member on said safety bar means upon movement of said detent means from said holding position to said release position.

9. In a chain saw according to claim 7, the further improvement comprising

A. a first rotatable connection of said safety bar means to the housing, and

B. a second rotatable connection of said detent means to the housing spaced, along a second direction transverse to said first direction, by a first distance from said first rotatable connection.

10. In a chain saw according to claim 9, the further improvement wherein said spring member is engaged between said safety bar means and said detent means at a location spaced along said second direction by a distance greater than said first distance.

11. In a hand portable chain saw having a housing, a sawing chain mounted on an arm extending forward from the housing, motive means coupled for driving the sawing chain, a safety bar rotatable relative to the housing between a braking position and an operating position, and brake means coupled with the safety bar for brakingly engaging the motive means for stopping the sawing chain and alternatively for release from the motive means, the improvement comprising A. detent-engaging means mounted for movement with the safety bar along a first direction between said braking and said operating positions thereof, B. first arm means extending longitudinal to said first direction and rotatably mounted for rotation relative to the housing about an axis different from the rotation axis of the safety bar, and having detent means for releasable latching engagement with said engaging means when the safety bar is in said operating position, and C. lineally-acting spring means engaged with said first arm means and with the safety bar for urging said arm means rotatably into said latching engagement with said engaging means, and for urging the safety bar from said operating position into said braking position.

12. In a hand portable chain saw according to claim 11, the further improvement comprising A. a detent bracket rotatably mounted to the housing and forming said first arm means and further providing a second arm extending transversely to said first direction, and B. wherein said spring means is engaged between said second arm and the safety bar.

13. In a hand portable chain saw according to claim 12, the further improvement wherein said safety bar comprises a U-shaped barrier, the side portions and bottom portion of which extend respectively about the sides and top of the housing, and is rotatably mounted at the end of each side portion to the housing adjacent a lowermost location on the housing.

14. In a hand portable chain saw according to claim 13, the further improvement wherein A. said spring means is located spaced from said rotatable mounting of said safety bar in the direction toward the top of the housing, and B. said detent bracket is rotatably mounted to the housing at a location intermediate said rotatable mounting of said safety bar and the location of said spring means.

15. In a hand portable chain saw having
a housing with top, bottom and sides and a carrying handle;
a cutting chain mounted on an arm extending forward from the housing;
motive means coupled for driving the cutting chain;
a safety bar mounted on the housing for swinging movement between an operating position and a braking position; and
a chain brake coupled with the safety bar for brakingly engaging the motive means to stop the chain and alternatively for release from the motive means;
the improvement wherein A. said carrying handle comprises a housing-encircling wrap-around handle extending about the top of the housing and about the housing sides to a substantially lowermost location thereon, B. said safety bar comprises a housing-encircling wrap-around barrier disposed forward of said carrying handle and extending at least substantially coextensively with said handle about the top and sides of the housing, and C. said chain brake includes brake control means having a spring exerting resilient force between said safety bar and the housing both for biasing said safety bar from said operating position into said braking position and for imposing a yieldable latching force on said safety bar for normally holding it in said operating position.

16. In a hand portable chain saw according to claim 15, the further improvement comprising
   A. shaft means mounting said safety bar to said housing adjacent the bottom thereof, and
   B. spring-mounting means on said safety bar and on said housing and disposing said spring for applying said resilient force to said safety bar at a distance from said mounting thereof such that the span of said safety bar along such distance provides a moment arm for the force of said spring.

* * * * *